United States Patent [19]

Sandlofer

[11] Patent Number: 4,852,295
[45] Date of Patent: Aug. 1, 1989

[54] OPEN WATER LIVE TRAP FOR PINNIPEDS AND OTHER MARINE ANIMALS

[76] Inventor: Michael Sandlofer, 610 City Island Ave., City Island, N.Y. 10464

[21] Appl. No.: 297,454

[22] Filed: Jan. 13, 1989

[51] Int. Cl.$^4$ ............................................. A01K 69/00
[52] U.S. Cl. ...................................... 43/100; 43/102; 43/104; 43/105; 43/106
[58] Field of Search ................ 43/100, 102, 103, 104, 43/105, 106, 60, 64, 67, 68, 69

[56] References Cited

U.S. PATENT DOCUMENTS 3,922,812  12/1975  Steele ..................................... 43/100
4,437,259   3/1984  Holyoak ................................. 43/105

*Primary Examiner*—Nicholas P. Godici
*Assistant Examiner*—Michael William Starkweather
*Attorney, Agent, or Firm*—Flehr, Hohbach, Test, Albritton & Herbert

[57] ABSTRACT

A trap suitable for capturing a marine animal in open water without harming the captured animal is disclosed. The trap includes a pen having top and bottom ends. A portion of the bottom of the pen includes a flotation element which is sufficiently buoyant to support a substantial percentage of the pen above the water line. The pen further includes a top rim which has an interior opening large enough to receive the captured animal. The platform is slidably coupled to the pen. The platform serves as a flotation device that is suitably buoyant to support the weight of the animal sought. A trap door within the platform is designed to release when an animal climbs thereon. When the trap door is actuated the pen is released from the platform and rises vertically relative to the platform to capture the animal.

11 Claims, 4 Drawing Sheets

OPEN WATER LIVE TRAP FOR PINNIPEDS AND OTHER MARINE ANIMALS

BACKGROUND OF THE INVENTION

The present invention relates generally to a live trap for capturing air breathing marine animals in open water without physically harming the animal. More particularly, the preset invention relates to a trap that forms an island upon which a marine animal may climb, and in which it becomes caged in a manner that allows the captured animal to breathe air.

There are wide varieties of air breathing animals such as seals, sea lions, penguins, walruses and the like, which spend a substantial percentage of their life in a pelagic environment, yet occasionally return to land for such purposes as breeding, raising young, rest, or protection. It is relatively easy to capture and study such animals while they are on land since they can easily breathe when captured. However, to more fully understand the animals' life cycle, including their nutritional needs, general health, and migratory habits, it is important to be able to capture the animals in open water for study. In the past, collecting such animals in open water has often resulted in the death of the captured animals since animals captured in netting and conventional traps frequently drown before being retrieved. Therefore, many scientific researchers have concluded that a more humane way to collect marine animals in open water is to sacrifice the animals. While animals captured using such approaches can be examined for stomach contents and general health, such approaches are far from humane and are self-defeating as to preservation of the species. Therefore, there is a need for a trap capable of capturing air breathing marine animals in open water without sacrificing the captured animal. Such a trap may be used for a wide variety of other purposes as well. For example, "nuisance" animals may be captured and relocated, tagged animals may be recaptured to facilitate scientific research, and injured animals may be captured for treatment.

SUMMARY OF THE INVENTION

Accordingly, is a primary object of the present invention to provide a trap suitable for capturing marine animals in open water without harming the captured animal.

Another object of the invention is to provide a trap capable of supporting the captured animal sufficiently that it can readily breathe when trapped.

To achieve the foregoing and other objects and in accordance with the purpose of the present invention, a live trap is provided for capturing pinnipeds and other marine animals in open water. The live trap includes a pen having top and bottom ends. A portion of the bottom of the pen includes a flotation element which is sufficiently buoyant to support a substantial percentage of the pen above the water line. The pen further includes a top rim that has an interior opening large enough to receive the captured animal. A platform is slidably coupled to the pen for movement along the pen's vertical axis. The platform forms a flotation device suitably buoyant to support an animal lying thereon with its head above the water line. A trap door is pivotably coupled to the platform. A cage is fixedly suspended below the platform, and is arranged such that the trap door will open into the cage. The trap door is sufficiently large to receive the animal sought to be captured.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
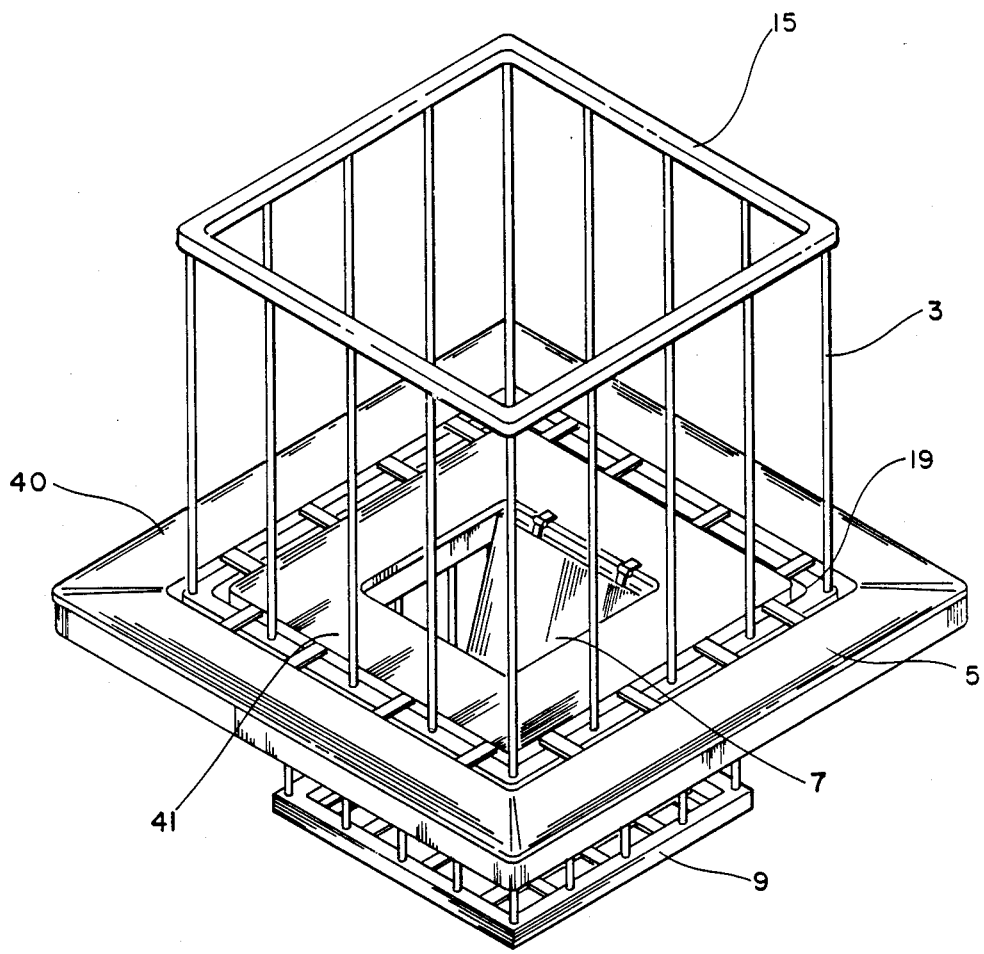
FIG. 1 is a perspective view of the live trap of the present invention in ready position.
Figure 2:
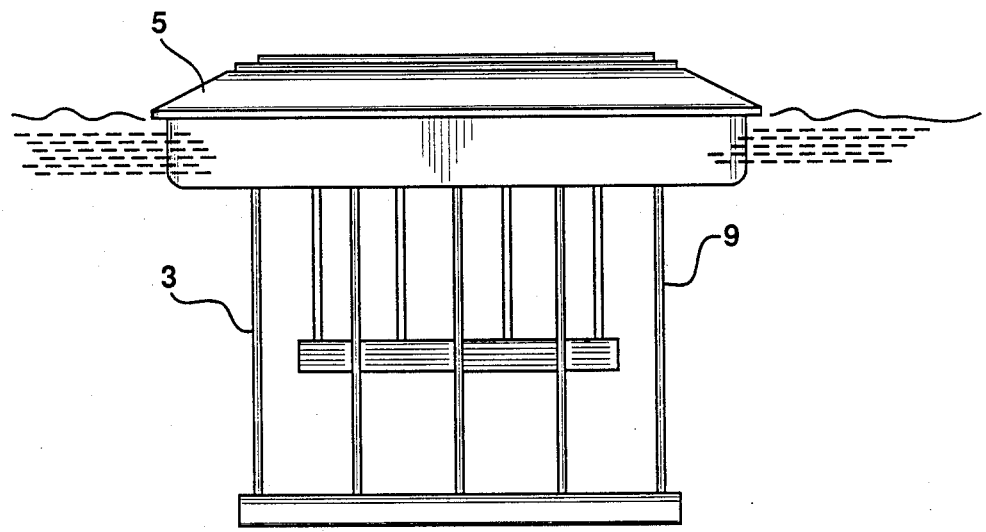
FIG. 2 is a front elevational view of the live trap shown in FIG. 1 in its ready position.
Figure 3:
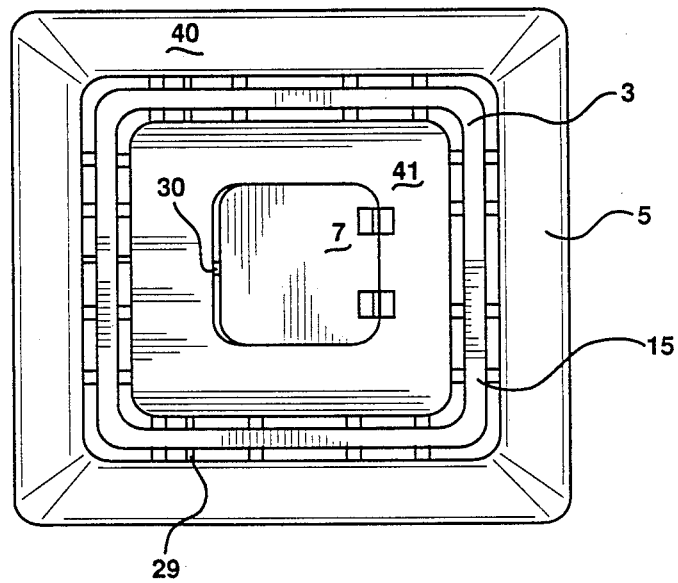
FIG. 3 is a top view of the live trap shown in FIG. 2.
Figure 4:
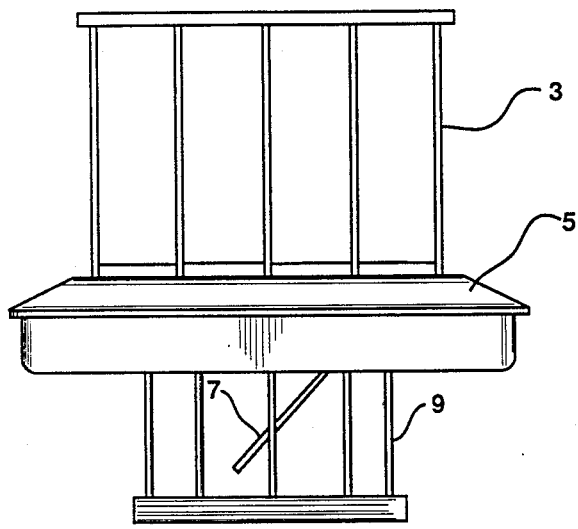
FIG. 4 is a front view of the live trap shown in FIG. 1 after it has been actuated.

The live trap 1 of the present invention includes a pen 3, a platform 5, a trap door 7, a cage 9, and trigger mechanism 11. Referring initially to FIG. 1, the pen 3 is sized suitably to comfortably receive the seals, sea lions or other animals for which the trap is intended. For the purposes of the description below, it will be assumed that the animal sought is a seal, although it should be appreciated that the actual size of the pen may vary significantly dependent upon the size of the animals it is intended to capture.

Figure 5:
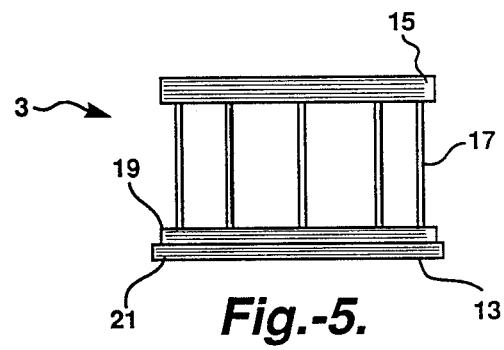
FIG. 5 is a side elevational view of the pen.
Figure 6:
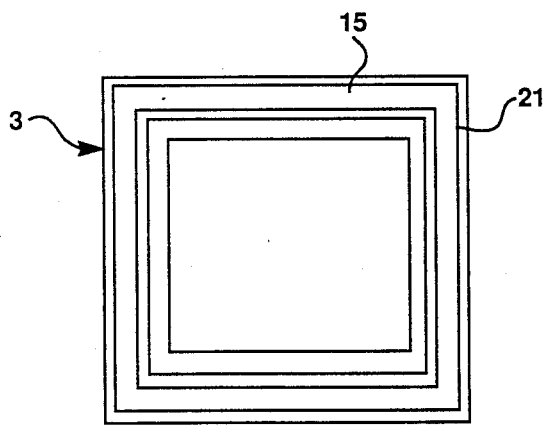
FIG. 6 is a top view of the pen shown in FIG. 5.
Figure 7:
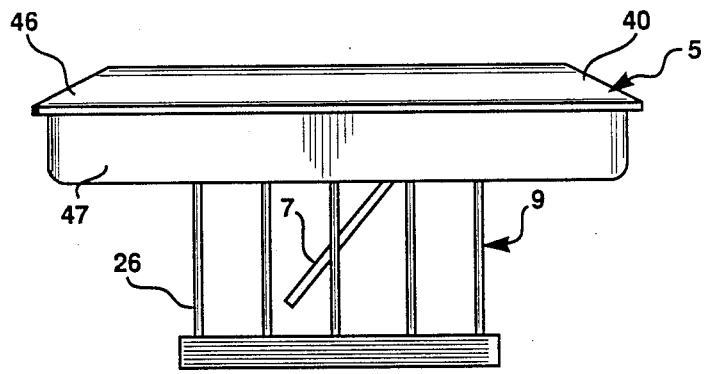
FIG. 7 is a side elevational view of the platform and cage arrangement with the trap door shown in the sprung position.
Figure 8:
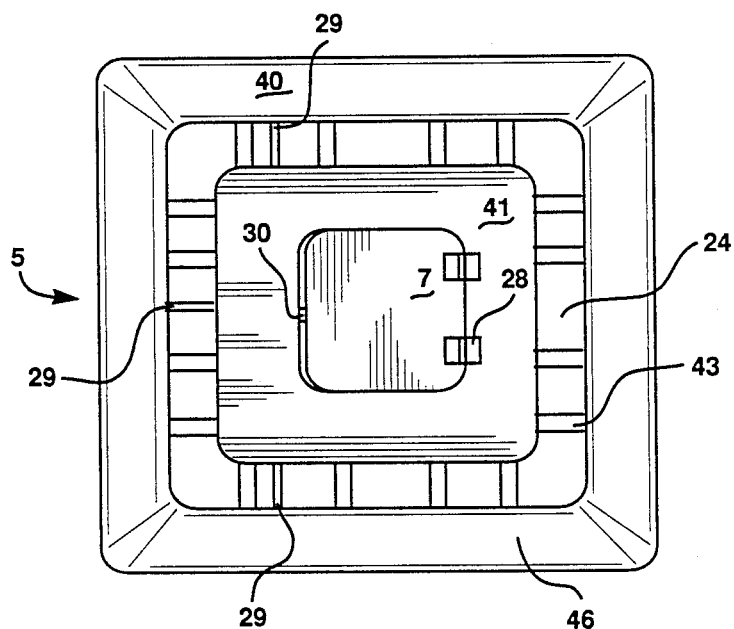
FIG. 8 is a top view of the platform shown in FIG. 7.

As detailed in FIGS. 5 and 6 the pen is outfitted with a flotation element 13 that forms a portion of the bottom of the pen. A top rim 15 forms an open entrance to pen 3, while flotation element 13 forms an open base. A plurality of spaced apart bars 17 extend between the flotation element 13 and the top rim 15 to form the walls of pen 3. The flotation element 13 can be formed of any suitable buoyant material which will not become waterlogged during prolonged exposure to the ocean. By way of example, a rectangular wooden frame 19 having styrofoam 21 attached thereto works well. The pen 3 is designed to be positively buoyant so that when released, the walls of the pen 3 formed by bars 17 will extend substantially above the water line.

The platform 5 is slidably coupled to the pen for vertical movement relative thereto. Specifically, the platform has a footprint somewhat larger than the pen 3 and may include a plurality of apertures 24 adapted to slidably receive the bars 17. The platform itself is formed of a buoyant material and has sufficient buoyancy to support a captured seal in a position such that it can readily breathe air without having to swim. In the embodiment of the invention shown in the Figures, the platform includes a frame 40 and a support pad 41. A multiplicity of spaced apart risers 43 couple the frame to the support pad. The spaces between risers 43 form the apertures 24. With this construction, the support pad 41 forms the portion of platform 5 within the interior of the pen 3. The platform is arranged to have sufficient buoyancy to fully support the captured animal. By way of example, suitable flotation may be provided by fabricating the support pad 41 and trap door 7 from styrofoam.

The frame 40 may include a wooden brace 46 having a styrofoam base 47 attached to its lower side.

A trap door 7 is pivotally coupled to the platform within support pad 41. The trap door is sized large enough to receive a captured seal. The actual proportions of the trap door size relative to the entire support pad may be widely varied. However, generally, it is desirable to make the support pad large enough that the captured animal can lie on the support pad within the pen and apart from the trap door. A cage 9 formed from a plurality of spaced apart rods 26 is suspended beneath the platform 5 such that anything passing through trap door 7 will pass into the cage 9. The cage 9 is negatively buoyant to provide stability and remains submerged after the pen has been activated. By way of example the rods 26 may be formed of steel encased by PVC pipe. A pair of hinges 28 pivotally couple the trap door 7 to platform 5. The hinges are mounted such that the trap door may open downward relative to the platform 5.

With this arrangement, the captured animal can climb out of the cage 9 onto support pad 41 of platform 5 in order to rest. However, since the cage 9 remains submerged, the captured seal has the option of remaining submerged if, for example, thermal regulation or stress reduction is necessary. Of course, the actual proportions of the trap door size relative to the entire support pad may be widely varied.

A latching mechanism is provided to hold the pen 3 relative to the platform 5 until after the trap door has been released. When the animal crawls over the trap door, the latch releases, allowing the trap door to swing about hinges 28. A transponder (not shown) may also be provided to alert reconnaissance personnel when the trap has been activated, and an animal captured. A trigger mechanism that detects movement of the trap door is arranged to activate the transponder. It will be appreciated that the trigger mechanism may be activated by movement of the pen as well.

In operation, the live trap is carried into waters wherein the seals are known to frequent. The trap may be left by itself and periodically checked to determine whether an animal has been captured. In the ready position shown in FIG. 1, the top rim 15 of pen 3 is substantially coplanar with the platform 5. The cage 9 is suspended below the trap door 7 in platform 5, while the majority of pen 3 extends below the trap. A passing seal may decide that the trap looks like an attractive resting spot and climb aboard. The platform has sufficient buoyancy to fully support a seal resting thereon. As the seal positions itself on the platform 5, it will eventually wander over to trap door 7. When this occurs, the seal's weight breaks a latch associated with the latching mechanism and the trap door is opened causing the seal to fall into the cage 9. When the latching mechanism is released, a plurality of pins 29 that extend between platform 5 and the top rim 15 are withdrawn, thereby releasing the pen 3. Since the pen is positively buoyant, it will rise until the flotation element 13 abuts against the bottom of platform 5. When this occurs, the top rim 15 will extend well above the water line. By way of example, in a live trap adapted for capturing California sea lions, the pen 3 would be sized such that when the trap is activated, the top rim will extend approximately 6–8 feet above the platform 5.

At this point the seal is effectively captured. Trap door 7 swings loose about hinge 28. Therefore the captured seal is free to climb out of the cage 9 onto the more comfortable platform 5. It will be appreciated that even with the seal resting on the platform 5, its upper surface 31 will ride above the water line. By way of example, a suitable size for the platform is 14' by 14', although the actual dimensions may be widely varied.

Although only one embodiment of the present invention has been described, it should be understood that the present invention may be embodied in many other specific forms without departing from the spirit or scope of the invention. Particularly, it should be appreciated that the specific construction of the various parts may be widely varied within the teachings of the present invention. For example, the buoyant material used to form platform 5 and/or flotation element 13 may be widely varied and may be of a single, solid construction or a laminate structure such as styrofoam on wood. The cage could readily be modified by replacing the trap door 7 with an actuating pad slidably coupled to the cage 9. In such an arrangement, the entire actuating pad would slide vertically relative to the cage 9 when the captured animal sits on the actuating pad. In such an embodiment, the captured seal would always have some supporting pad underneath him to provide a more solid appearing trap. It should be appreciated that the triggering mechanism could be rigged such that relatively small movements of the actuating pad would release the pen 3 which would eliminate the need for the seal to climb out of the cage 9. Therefore, the present examples and embodiments are to be considered as illustrative and not restrictive, and the invention is not to be limited to the scope of the details given herein, but may be modified within the scope of the appended claims.

I claim:

1. A live trap for capturing pinnipeds and other marine animals in open water comprising:
   a pen for holding captured animals, the pen including an interior chamber sized suitably to receive the captured animal;
   a platform for supporting the captured animal, the platform being slidably coupled to the pen for vertical movement relative thereto, the platform including flotation means for supporting the platform high enough in the water to allow an animal sitting thereon to breathe air;
   trigger means for causing the pen to rise vertically relative to the platform to capture any animal resting on the platform, wherein the trigger means is arranged such that it is activated only after an animal has climbed onto the platform.

2. A live trap as recited in claim 1 wherein said trigger means includes a trap door movably coupled to an interior portion of the platform, wherein after an animal has climbed onto the platform, the trigger means is activated by the animal stepping on the trap door.

3. A live trap as recited in claim 2 wherein the trap door is pivotally coupled to the platform and sized sufficiently large to receive the captured animal, the trap further comprising a cage coupled to the trap door and suspended below the trap door for receiving the captured animal in the event it falls through the trap door.

4. A live trap as recited in claim 1 wherein said pen is moveable from a first position wherein said top rim is substantially coplanar with the platform to a second position wherein said top rim extends substantially above the level of the platform,
   wherein when said pen is in said first position, animals are free to climb onto the platform and wherein when said pen is in said second position any animal resting upon said platform is captured within the pen and is prevented from leaving the trap.

5. A live trap as recited in claim 4 wherein said pen is positively buoyant and said trigger means includes a latch that holds the pen in said first position until said trap door is activated and that releases said pen when said trap door is activated, wherein the positive buoyancy of said pen causes said pen to move to said second position when the latch is released.

6. A live trap as recited in claim 1 wherein said pen includes a plurality of spaced apart bars that couple the flotation element to said top rim, said bars being positioned sufficiently close together to prevent the captured animal from escaping therethrough.

7. A live trap as recited in claim 6 further comprising a frame portion that circumscribes said platform and a plurality of spaced apart risers that couple the frame to the platform, the spacing between said risers forming a plurality of apertures for slidable receiving said bars.

8. A live trap as recited in claim 7 wherein said frame and said platform are spaced apart forming a channel therein, and wherein the top rim is received by the channel when the pen is in said first position.

9. A live trap as recited in claim 4 wherein said platform includes a base portion, a frame portion circumscribing the base portion, a channel separating said frame portion and said base portion for receiving said top rim of said pen, and a plurality of apertures for slidably receiving said bars.

10. A live trap for capturing pinnipeds and other marine animals in open water comprising:

a pen for holding captured animals, the pen having top and bottom ends and including an interior chamber sized suitably to receive the captured animal, a rim forming a portion of the top of the pen, a flotation element forming a portion of the bottom of the pen, and a plurality of spaced apart bars that couple the flotation element to the rim;

a platform for supporting the captured animal and including flotation means for supporting the platform high enough in the water to allow an animal sitting thereon to breathe air, and a plurality of apertures for receiving said bars to permit slidable movement between the pen and the platform;

trapping means for causing the pen to slide upwardly relative to the platform after a desired animal has climbed onto the platform to capture the desired animal.

11. A live trap as recited in claim 10 wherein said platform further includes a channel disposed above said apertures for receiving said top rim, said pen being moveable between a first position wherein said top rim is received by said channel and substantially coplanar with the top surface of said platform, and a second position wherein said top rim extends substantially above the level of the platform, wherein when said pen is in said first position, animals are free to climb onto the platform and wherein when said pen is in said second position any animal resting upon said platform is captured within the pen and is prevented from leaving the trap.

* * * * *